United States Patent [19]
Lord et al.

[11] Patent Number: 5,273,436
[45] Date of Patent: Dec. 28, 1993

[54] CHANGEABLE GRID SYSTEM KIT

[76] Inventors: Weston Lord, Bald Mountain Rd., Oquossoc, Me. 04913; James Hoover, 122 Grants Point, Biddeford, Me. 04005; George Forman, 19th Hollow, Amherst, Mass. 01002

[21] Appl. No.: 792,952

[22] Filed: Nov. 15, 1991

[51] Int. Cl.$^5$ .................. G09B 23/08; A63H 33/08
[52] U.S. Cl. .................. 434/302; 434/300; 446/118; 446/168
[58] Field of Search ............. 446/118, 126, 168; 434/300, 302, 72; 273/86 C, 121 B, 120 R, 145 B, 110, 111; 472/62

[56] References Cited

U.S. PATENT DOCUMENTS

| | | | |
|---|---|---|---|
| 271,530 | 1/1883 | Spang | 273/86 C X |
| 2,023,300 | 12/1935 | Barnett | 446/86 |
| 2,883,764 | 4/1959 | Stephens | 434/72 |
| 3,280,499 | 10/1966 | Studen | 446/118 |
| 3,286,391 | 11/1966 | Mengeringhausen | 446/126 X |
| 3,822,499 | 7/1974 | De Vos | 446/121 |
| 4,270,302 | 6/1981 | Dandia | 446/118 X |
| 4,400,906 | 8/1983 | Bove | 446/118 X |
| 4,650,437 | 3/1987 | Sitkus | 446/128 |
| 4,758,195 | 7/1988 | Walsh | 446/85 |

FOREIGN PATENT DOCUMENTS 489242 1/1930 Fed. Rep. of Germany ...... 446/168
524064 8/1921 France .

*Primary Examiner*—Mickey Yu
*Attorney, Agent, or Firm*—Thomas L. Bohan

[57] ABSTRACT

A changeable grid system kit for constructing three-dimensional toy and scale model designs, including a base component fabricated of a tough, resilient material, slots formed in the top face of the base, and slats which are insertable into the slots. The invention is designed to ensure that there is little or no loss in the tight fit between the slats and the base material after repeated insertion and removal of the slats. The base material is selected so as to avoid fracturing or splintering caused by repeated use or incidental contact. One such material is a closed-cell crosslinked polyethylene foam. In one embodiment of the invention, the base component is placed vertically such that the slats extend from the slots to form quasi-horizontal surfaces. In this orientation the present invention may be used as an educational tool to illustrate such physical principles as gravity, friction, and the like. A ball may be rolled down pathways created by insertion of the slats into the slots in a variety of configurations, thereby illustrating the principles noted and encouraging experimentation by the student.

7 Claims, 3 Drawing Sheets

12

12

CHANGEABLE GRID SYSTEM KIT

BACKGROUND OF THE INVENTION

1. Field of the Invention

This invention relates generally to a kit for the temporary construction of a variety of three-dimensional models and designs. More particularly, this invention relates to a construction set to be used as an educational tool or toy for children, or as a scale model planning tool. The kit comprises a resilient base with a plurality of intersecting slots, and a plurality of slats that may be inserted into and removed from the slots. The slots are formed such that the slot-widening which is caused by insertion of the slats is effected primarily by the shear associated with a lateral displacement of the intra-slot base material rather than by a crushing of the material. The base material itself is formed of a resilient foam such that upon removal of a slat the lateral displacement is removed along with the small compression that may have occurred, thus re-establishing the narrow slot. Still more particularly, when the kit is used as an educational tool to illustrate the effects of gravity, friction, and other related physical principles, the base is oriented in a quasi-vertical fashion and the slats configured so as to provide both horizontal and vertical surfaces which in turn define pathways along which rollable objects can traverse under the forces of gravity.

2. Description of Prior Art

Scale model construction kits have been designed for many years to assist in visualizing the size, shape and arrangement of rooms and/or buildings. Architects consider them advantageous tools, providing a better understanding of two-dimensional plans. Building planners use them to arrange furniture and equipment in preexisting and future spaces. One example of this type of construction set is presented in U.S. Pat. No. 4,650,437 issued to Sitkus (1987). These kits may also be used as educational toys for children. See for example U.S. Pat. No. 4,270,302 issued to Dandia (1981).

Both patents noted above disclose construction sets which generally comprise a horizontal base unit into which vertical members are inserted. This is the form of most construction sets. In particular, the base is commonly grid-like and the vertical members are fitted into grooves, slots, or something similar within the grid system. The vertical members can be moved to various positions on the base because they are not permanently attached to it. Typically, a tight fit between the vertical members and the grooves is all that is necessary to hold a three-dimensional model in place. The vertical members can thus be maintained in position without extraneous attachment means. This is an important feature and a necessary one if the set is to be used in visualizing a variety of configurations.

As will be discussed in more detail in the following paragraphs, there are two problems associated with the construction sets of past and current design: 1) the size of the groove or slot in the gridwork of the base increases with repetitive insertion and removal of vertical members, caused by forcing the vertical member into place and "wiggling" to extract it, resulting in a significant crushing of the base material defining the slot and hence in an increasingly loose fit and easy displacement of the vertical member over a period of time; and 2) the materials used in the fabrication of construction sets, typically wood, rigid plastics and even metal, are susceptible to chipping and/or splintering, which may render the set useless, and, in the case of a toy construction set, dangerous.

It is because the construction sets currently available are made of wood, metal or a rigid plastic that they have little or no "memory." This memory is the ability of a material to return to its original shape and dimensions after a strain-producing force has been applied to it. Relating to construction sets, such a force occurs when the vertical member is placed in the grid system of the base. At that interface, the vertical member, which by the nature of the assembly must be slightly thicker than the groove width, exerts an outward force on the material of the base and the grid exerts a correponding inward force on the section of the vertical member that it contacts. The force on the vertical member compresses it; the force on the grid material comprising the walls of the grooves expands the size of those grooves as the result of a combined compressional/shear strain. In traditional systems, the balance of strain is in the direction of compression, with the result that over a period of time the forces acting on the grid material comprising the walls of the grooves create a permanent change or "compression set" in the base material. The exact details of this compression set are dependent upon the length of time the force is applied and the characteristics of the material(s) involved; nevertheless, it is an endemic problem with traditional systems, leading inexorably to a loss of slot-retention capacity.

Because it is a particular feature of these construction sets that room/building arrangements can be easily varied, insertion and extraction of the vertical members occurs often. The first time a vertical member is placed in a groove, the fit is the tightest. Repetition of the process results in progressively looser fits, due to the thickness reduction of the vertical member and/or width increase of the grooves. At that time the construction set becomes unusable because the three-dimensional model can no longer be maintained in place.

Another problem associated with the metal, wooden, and other rigid construction sets, is the susceptibility of the material to splinter or fracture. This may occur when the vertical member is inserted into or removed from the groove, or it may be caused by incidental contact with a destructive force. Depending upon the location of the splinter or fracture, one or more components of the set may become unusable. Splinters and fractures may be particularly dangerous when a child is using the set to arrange a variety of three-dimensional designs and removal and insertion of vertical members happens on a regular basis.

The prior art of construction sets has failed to address the need to fabricate these sets of a material with good memory (that is, little or no compression set), tough enough not to splinter or fracture, and yet rigid enough to maintain the vertical and base components in position. For example, French Patent No. 524,064 issued to Girlot (1921) discloses a construction game the novelty of which is embodied in its capability to provide a realistic scale-model of stable fabrication. It comprises vertical panels and a base into which crisscrossing grooves are scored. The vertical members slide into the grooves and are then locked into position with an additional component. It teaches that the base may be made of wood or any other suitable material, such as cardboard. It fails to identify the problems associated with wooden construction sets, i.e. a lack of memory and susceptibility to splintering. Although sliding the vertical members into place indicates memory may not be required for this particular set, locking the vertical members into place using additional parts is a complicating feature which reduces the desired simplicity of these types of construction sets, particularly when the user is a child.

U.S. Pat. No. 2,883,764 issued to Stephens (1959) discloses a means for designing and laying out plans for buildings, comprising a base with slots into which vertical members are inserted. The vertical members must be fitted into the slots to produce a scale model construction. U.S. Pat. No. 2,023,300 issued to Barnett (1934) describes a re-arrangeable toy model set comprising a grid-like base and removable vertical members. However, the components are made of wood or solid rubber and a mallet must be used to secure the vertical members in place. Both Stephens and Barnett fail to address the importance of fabricating the components of the model set from a material that recovers after force has been applied and which does not splinter or fracture. Furthermore, the need to have a supplemental tool to fit the vertical members into the grid, as indicated by Barnett, is undesirable when the device is to be used by young children wherein such tools add to the complication and may be easily lost over a period of time.

U.S. Pat. No. 4,400,906 issued to Bove (1983) is also for a construction set. It describes a set containing a base with a grid-like set of mortises or tenons into which partition modules are inserted. The disclosure states that the mortises may be molded or calendered and the tenons may be machined. This instruction indicates Bove has failed to address the problems associated with the current materials of choice. As further stated by Bove, the dimensions and distribution of the mortises and tenons must be determined precisely. To do so, the material used for the base must be metal, wood, or a rigid plastic. This teaches away from the need for a resilient material, that is, one with good memory, because a resilient material is unsuitable for machining to precise dimensions.

Toy products fabricated of resilient foam have been described in the past. See, for example, U.S. Pat. No. 3,822,499 issued to DeVos (1974) and U.S. Pat. No. 3,280,499 issued to Studen (1966). Both patents disclose products made of polymeric foam material wherein the materials used avoid the problems of fracturing and splintering. In addition, both patents note the advantages of using a material with memory. Nevertheless, the DeVos and Studen disclosures fail to address the problems associated with the usage of foam materials in a grid base for a rearrangeable three-dimensional design. Specifically, while polymeric materials all have memory to varying degrees, all will eventually "set" when the material is compressed. The extent of the set is dependent upon the material and the length of time it is under load. When the object of an invention is to provide a grid system for repeated insertion and removal of vertical members, it is essential to minimize if not eliminate set of the base component. Thus, while the use of a resilient material, and even a resilient foam material, is important to kit longevity, it is particularly important to combine that characteristic with a grid design that complements and takes advantage of the material's resiliency.

Prior systems utilizing resilient/foam materials as the base component in rearrangeable toy construction devices include those described in patents issued to Mengeringhausen, U.S. Pat. No. 3,286,391 (1964) and Walsh, U.S. Pat. No. 4,758,195 (1988). Both disclosures note the advantage of using either a resilient or resilient-foam material with receptacles into which rigid components may be inserted and then removed. Both disclosures fail, however, to note that even these materials, used in the ways described, will develop a compression set that ultimately comes from repeated insertion and removal. Therefore, what is needed is a resilient foam material to be used in a grid base design that overcomes problems associated with compression set. What is also needed is a rearrangeable grid system with a base component that is fabricated of a material with memory, toughness and yet sufficient rigidity such that: 1) repetitive insertion and extraction of removable components will not result in a loose fit of those components; and 2) splintering and/or chipping of the components will not occur.

In addition to the general problems associated with prior construction sets, there are additional problems associated with rollways and other similar devices that teach children about basic physical principles. Most of these types of prior construction sets have been designed to assist children in forming shapes, toys and building models. Although some may be adapted for use as tools to assist children in comprehending such principles as gravity, momentum, friction, acceleration and others, not one is capable of illustrating such principles on a scale suitable for children. Furthermore, prior devices used for this purpose generally fail to permit a child to alter the means by which these principles can be illustrated. This failure relates to an essentially complete breakdown of the device when one or more components of the device are removed for alteration of pathways and the like formed by a plurality of components. This is a problem of particular concern when the user is a young child and it becomes difficult to reform a pathway when a component has been removed. Also, the prior devices generally available are not designed to withstand the impact and weight associated with rollable and slidable objects suitable for illustration of the effects of gravity, friction and the like. Therefore, what is needed is a changeable, or rearrangeable grid system which permits a child to proceed at his or her own pace in discovering and exploring basic forces. What is also needed is a changeable grid system kit wherein the components of the system are easily reconfigured without a complete breakdown of the system itself. Furthermore, what is needed is an educational changeable grid system designed to withstand the impact and loading associated with rollable and slidable objects of a size suitable to illustrate the basic forces described herein.

SUMMARY OF THE INVENTION

It is an object of the present invention to provide a changeable grid system kit that may be used to produce a variety of three-dimensional configurations. It is another object of the present invention to provide a changeable grid system kit comprised of a base component and removable partitions, in which many configurations are easily achievable and in which a particular configuration may be left in place for an extended time period without causing a permanent distortion in any of the elements of the kit. In particular, the object is to provide a resilient base component which will not take on a permanent "set" regardless of the duration of its use with a particular array of partitions. It is still another object of the present invention to provide a changeable grid system that is safe to the user, particularly when the user is a child. Furthermore, it is an object of the present invention to provide a changeable grid system that may be used as a children's educational tool, especially one directed to explicating the effects of gravity, friction, and angular momentum on rollable or slidable objects, in addition to presenting elementary architectural principles.

The present invention comprises a base fabricated of a tough, resilient material into which moveable partitions are removably inserted. Inexpensive model construction sets currently available as toys or as design aids are fabricated of wood, metal, and various types of plastics. Their useful life is limited and there exists the possibility of the material fracturing or splintering. The present invention eliminates the problems of the current construction sets by utilizing a tough, resilient material configured in a design which makes maximum effective use of the material's "memory." In the invention, a plurality of partition-accepting intersecting slots are cut, machined, molded, or otherwise set into the face of the base so as to form a grid board. These slots are narrower than the removable partitions and of sufficient depth to securely hold the partitions in position. The difference between the slot widths and the thickness of the moveable partitions ensures a tight fit between the partitions and the grid board. Numerous parallel slots are formed in the face of the base component, defining "islands," such that insertion of the moveable partitions causes a lateral displacement of the upper portion of the base "islands" next to the partitions, rather than a lateral crushing of the base material. In this way, the force exerted by the introduced partition is converted primarily into shear forces in the resilient base material and, in this manner, the slots can open to receive the partitions without the need for significant compression of the base material. Instead, the upper portion of the resilient material simply shifts to a new position. In designing the grid system it is necessary to provide a sufficient number of parallel slots to permit insertion of any number of partitions while maintaining shear force exertion on the base material. Through this design, the life of the grid system of the present invention is extended far beyond that available to prior grid systems intended for the repetitive insertion and removal of planar objects into slots. In the present invention, repeated insertion and removal of the moveable partitions will not loosen the fit between the slots and the partitions. Furthermore, the material is of sufficient toughness that it does not fracture or splinter as a result of repeated use or incidental contact.

A key feature of the present invention is the use of the system described above to form an educational tool that takes advantage of a child's imagination. Specifically, when the base component is oriented vertically, the grid system with rearrangeable partitions may be used to teach basic physical principles—such as that of gravity and its effects on rollable objects—at the individual child's particular pace. As will be described more fully below, when a plurality of partitions (slats) are inserted into the slots—which are themselves formed at any of a variety of angles in the plane of the base—a series of ramps and openings can be created, thereby forming a pathway or a series of pathways. The number of ramp and opening combinations available to the child is limited only by the size of the base, the number of slots, and the number of slats used. Upon completion of a particular pathway configuration, the child may start a ball down the pathway and observe the rate at which it progresses along its course. Changes in ball size and weight will alter the rate of descent. The base design permits the slats to perform independent of one another; that is, removal and re-insertion of a particular slat may be done without concern that adjacent slats will fall from the base. Slats fabricated of a material suitable to withstand the impact and loading of a wide variety of rollable objects, are sized to insure easy handling by a child and ready observation of the effects of the forces involved. For optimum performance in this mode, certain further requirements to be described below must be undertaken.

DESCRIPTION OF THE PREFERRED EMBODIMENT

Figure 1:
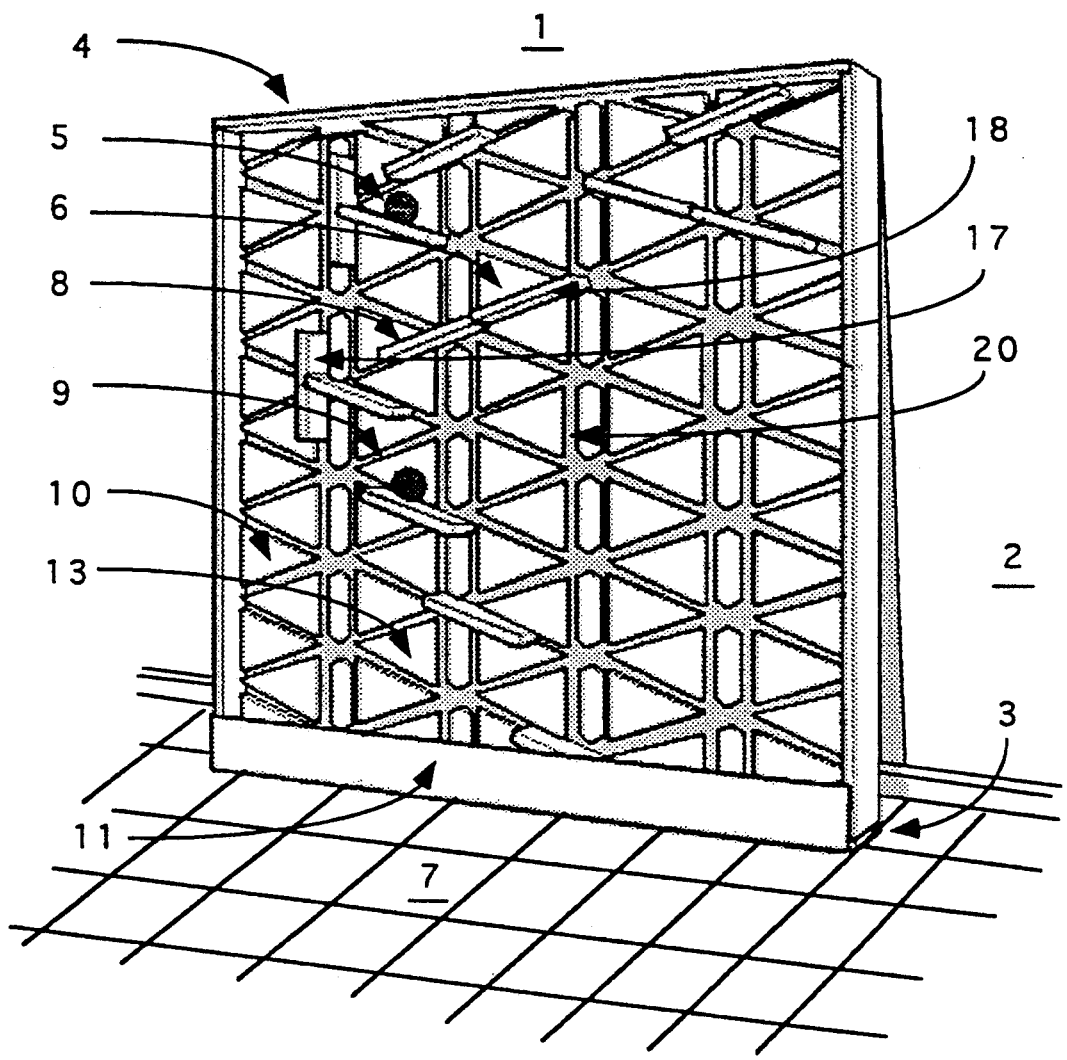
FIG. 1 is a perspective view of the present invention, oriented quasi-vertically, in operation as an educational tool with a ball travelling down a particular pathway.

The preferred embodiment of the present invention is directed toward a changeable grid system 1 to be used as an educational tool, as illustrated in FIG. 1. It is to be understood, however, that said grid system 1 may be oriented and configured in any number of ways without deviating from its basic functional features. In the preferred orientation set out in FIG. 1, said grid system 1 is mounted against a wall 2. Preferably, said grid system 1 is not placed flush against said wall 2; instead, a grid system bottom 3, located above a floor 7, is horizontally-oriented, and is set away from said wall 2 and a grid system top 4, also horizontally-oriented, contacts said wall 2. When said grid system 1 is used as an educational tool to illustrate the effects of gravity, friction, etc., balls 5, introduced and permitted to roll under gravity, travel down a reconfigurable pathway 6. When used for this purpose, the angle formed between said grid system 1 and said wall 2 is about 7°. Furthermore, when the invention is used for this purpose, a plurality of slats 8 that form said pathway 6 are set into slots 9 of a grid system base 10 at an upward angle of about 4°, so as to insure that said slats 8 make a total angle of approximately 11° with the horizontal. The 4° upward angle is achieved in the present invention by cutting said slots 9 into a top planar face 13 of said base 10 so as to make an angle of about 86° with said top planar face 13. The combination of the two angles permit said balls 5 to travel along said pathway 6 without becoming stuck at the dihedral angle formed by said slats 8 and said top planar face 13 of said base 10, and without falling off said slats 8. The combined upward angle is of particular importance when said balls 5 are made of fairly dense matter, such as metal. In that case, said slats 8 retained within said base 10 may be momentarily forced to bend down as said balls 5 pass over them or drop onto them. An upward angle is therefore necessary to prevent said balls 5 from rolling off of said slats 8. Vertical ball stops 17 within vertical ball stop slots 20 removably insertable along said pathway 6 further alter the course of said balls 5 as said balls 5 roll on angled slats 18. The angle of decline of said angled slats 18 is dependent upon the angle of decline of said slots 9 and may be varied as a function of the desired rate of descent. A ball-retention wall 11 traps said balls 5 as they complete their travel along said pathway 6.

Figure 2:
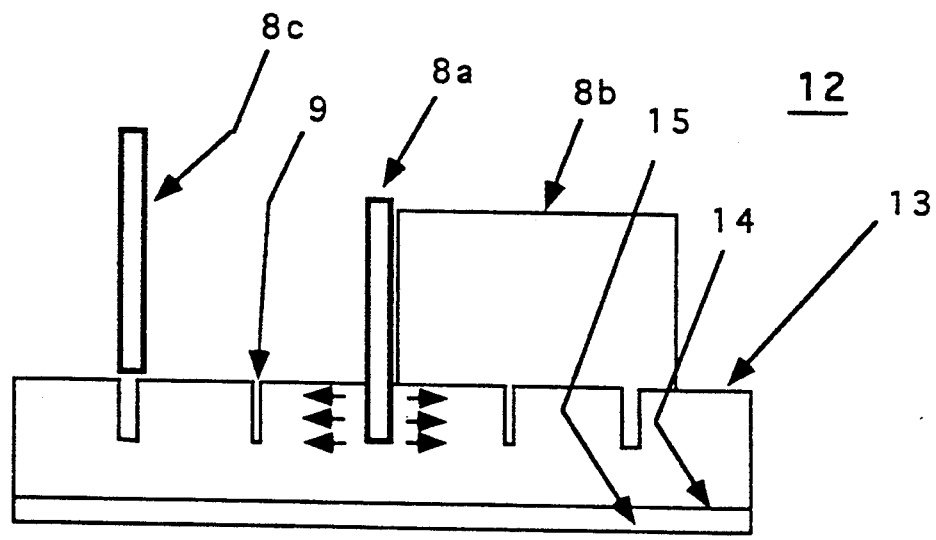
FIG. 2 is one side view of a section of the present invention with removable partitions inserted into the grid board.
Figure 3:
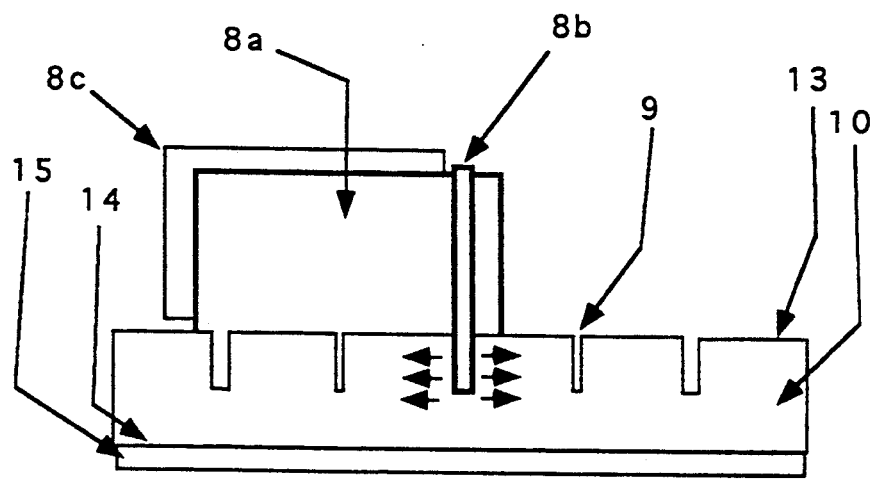
FIG. 3 is a side view of the present invention illustrating the same configuration presented in FIG. 1 rotated 90 degrees.
Figure 4:
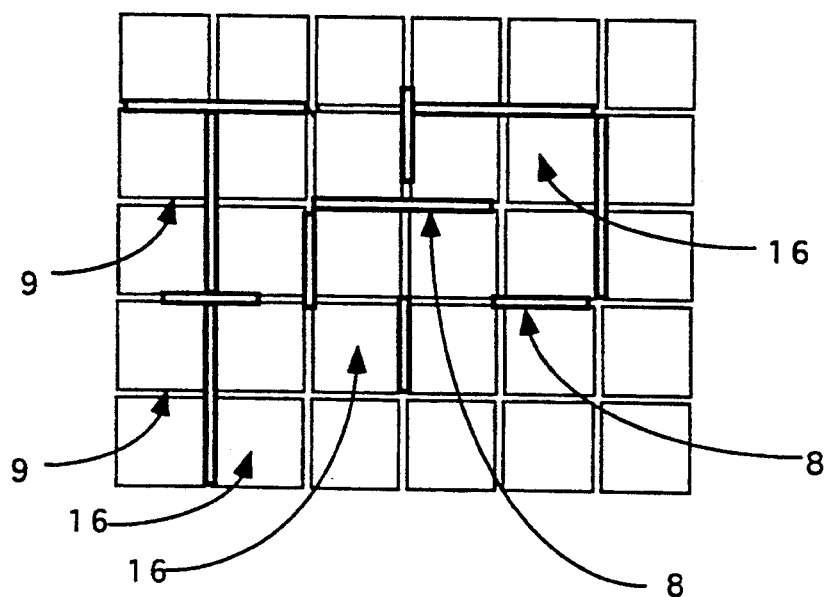
FIG. 4 is a top view of a section of the present invention with moveable partitions inserted into the grid board.

Said grid system 1 comprises at least one grid system section 12, as illustrated generally in FIGS. 2–4. Said grid system section 12 comprises at least one of said slats 8 insertable into said slots 9 of said base 10. Said base 10 comprises said top planar face 13 and a bottom planar face 14. In the preferred embodiment said slats 8 are about one-quarter inch thick and fabricated of a tempered masonite material, and said base 10 is about one and one-half inches thick and fabricated from a solid sheet of closed cell crosslinked polyethylene foam. However, it is to be understood that nothing in this description is intended to limit the materials of construction to a closed cell crosslinked polyethylene foam and a tempered masonite slat material. In particular, said base 10 may be fabricated of any material that can be fairly easily displaced laterally, and that has memory, toughness and rigidity; said slats 8 may be fabricated of wood, metal, or plastic.

In the preferred embodiment of the present invention, said closed cell crosslinked polyethylene foam used to form said base 10 has the following typical properties:
Density—1.5 to 2.5 pounds per cubic foot.
Compression set—20% maximum of original thickness.
Compressive strength—7 to 11 pounds per square inch at 25% deflection.
Tear resistance—6 to 13 pounds per inch.
The other demensions of said slats 8 and said base 10 are only limited by the materials of construction available. In the preferred embodiment of the invention, said slats 8 may be of a size suitable for easy removal and insertion into said slots 9 by a child. A grid base stiffener 15, preferably made of plywood or the like, is affixed to said bottom planar face 14 of said base 10 and is used to provide support to said base 10. Additionally, said grid base stiffener 15 may be used to affix a plurality of grid base sections 12 together to configure grid system 1 in various dimensions.

Figure 2A:
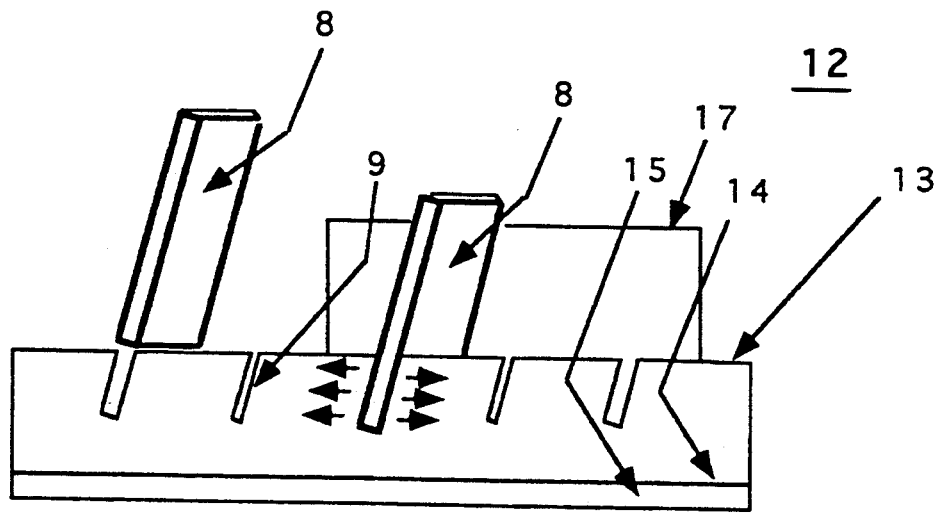
FIG. 2A is one side view of a section of the present invention with removable partitions inserted into the grid board, showing the slots at an angle of about 86° with respect to the top planar face of the grid board, and also showing the lateral displacement of base material in unoccupied adjacent slots.

In the embodiment of the invention illustrated in FIG. 1, said slots 9 are cut, machined or otherwise made in said top planar face 13 of said base 10 longitudinally and at a variety of oblique angles with respect to said grid system top 4. The particular oblique angle selected is dependent upon the desired rate of acceleration of said balls 5 down said pathway 6. Said slots 9 may also be cut into said top planar face 13 either perpendicular, or parallel to said grid system top 4. As previously noted, it is necessary in achieving the goals of the present invention that each of said slots 9 has a corresponding parallel slot adjacent to it and in close proximity to it, dependent upon the number of slats 8 to be used. A plurality of parallel slot families thereby results. In this way, when said slats 8 are inserted into said slots 9, grid base islands 16 of said base 10 are laterally displaced rather than crushed (i.e., move primarily under shear), as illustrated in FIG. 2A. As illustrated in FIG. 4, wherein said slots 9 are cut into said top planar face 13 at right angles with respect to said top planar face 13, said slots 9 are equally spaced so as to create a plurality of said grid base islands 16, wherein each of said islands 16 is about one and one-quarter inches on a side. To provide sufficient support to said slats 8 said slots 9 are cut into said base 10 to a depth of about one inch. To maintain said slats 8 in position on said base 10, said slats 8 must fit tightly within said slots 9. To achieve this tight fit, said slots 9 are cut to a width which is about 25 percent less than the thickness of said slats 8. Although as illustrated in FIGS. 2–4 said slots 9 are formed in said base 10 at a 90° angle with respect to said top planar face 13, it is to be understood that said slots 9 may be formed at other angles, as noted in the description of said grid system 1 when said grid system 1 is used as an educational tool as illustrated in FIG. 1, wherein said slots 9 are cut at an angle of about 86° as illustrated in FIG. 2A. When said grid system 1 is used as a three-dimensional modeling kit, said base 10 may rest on said floor 7 rather than said wall 2. In this orientation there may be no need to vary the angle at which said slots 9 are formed in said base 10.

After said slots 9 have been cut into said top planar face 13, said slats 8 may be inserted. As previously noted, a plurality of said grid base sections 12 may be aligned and affixed to one another so as to extend the size of said grid system 1. In addition to connection adjacent base stiffeners 15, said slats 8 may be used as supplemental connection means by inserting particular ones of said slats 8 into slots 9 of adjacent grid base sections 12.

Although the best mode contemplated for realizing and implementing the present invention has been herein shown and described, it will be apparent that modifications and variations of said mode may be made without departing from what is regarded to be the subject matter of the present invention.

We claim:

1. A changeable grid system kit for constructing a three-dimensional educational tool for illustrating physical principles, said grid system kit comprising:
   a. plurality of rigid slats;
   b. a grid system base fabricated of a tough, resilient material, said grid system base comprising a plurality of sets of parallel slots formed in a top planar face thereof, wherein any one of said rigid slats is removably insertable into any one of said slots, wherein the thickness of any inserted slat is greater than the width of the slot into which it is to be inserted; and
   c. one or more balls, wherein said top planar face of said base is orientable essentially vertically such that most of said slats when inserted into said slots are then oriented to form descending pathways along which said balls may travel under the joint influence of gravity and friction.

2. The changeable grid system kit as claimed in claim 1 wherein the depth of each of said plurality of slots is at least two-thirds the thickness of said grid system base.

3. The changeable grid system kit as claimed in claim 1 wherein the thickness of each of said slats is at least 25% greater than the width of said slots.

4. The changeable grid system kit as claimed in claim 1 further comprising one or more vertical ball stop slots oriented perpendicular to a horizontally-oriented grid system top of said grid system base.

5. The changeable grid system kit as claimed in claim 1 further comprising a grid system base stiffener affixed to a bottom planar face of said grid system base.

6. The changeable grid system kit as claimed in claim 1 wherein said grid system base is fabricated of a closed cell crosslinked polyethylene foam.

7. A changeable grid system kit for constructing a three-dimensional educational tool for illustrating physical principles, said grid system kit comprising:
   a. a grid system base fabricated of a closed cell crosslinked polyethylene foam of a certain base thickness, wherein said base comprises a plurality of intersecting slots in a top planar face thereof, wherein said intersecting slots are arrayed in slot families, each of said slot families comprising a plurality of parallel slots in close proximity to each other and wherein the depth of each of said plurality of intersecting slots is at least two-thirds the thickness of said grid system base;
   b. a plurality of slats fabricated of a rigid material, wherein said slats are removably insertable into said plurality of intersecting slots of said grid system base, wherein the thickness of each of said plurality of slats is at least 25% greater than the width of each of said intersecting slots;
   c. one or more vertical ball stop slots formed in said top planar face of said grid system base;
   d. a grid system base stiffener affixed to said grid system base; and
   e. one or more balls, wherein when said grid system base is placed in an essentially vertical position said grid system kit comprises a horizontally-oriented grid system top and a horizontally-oriented grid system bottom and wherein some of said plurality of slats are oriented at oblique angles with respect to said horizontally-oriented grid system top thereby forming descending pathways along which said balls may travel under the joint influence of gravity and friction, wherein said vertical ball stop slots are oriented perpendicularly to said grid system top and intersect one or more of said slot families.

* * * * *